US009294803B2

(12) United States Patent
Bond et al.

(10) Patent No.: US 9,294,803 B2
(45) Date of Patent: Mar. 22, 2016

(54) KIOSK SET-TOP-BOX

(75) Inventors: Brian Edward Bond, Fairmont, WV (US); Arjun Baskaran, Chennai (IN); Padmakumar Rajan, Chennai (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 917 days.

(21) Appl. No.: 13/208,949

(22) Filed: Aug. 12, 2011

(65) Prior Publication Data

US 2013/0042270 A1    Feb. 14, 2013

(51) Int. Cl.
*H04N 21/274* (2011.01)
*H04N 21/43* (2011.01)
*H04N 21/431* (2011.01)
*H04N 21/432* (2011.01)
*H04N 21/433* (2011.01)
*H04N 21/442* (2011.01)
*H04N 21/472* (2011.01)
*H04N 21/482* (2011.01)

(52) U.S. Cl.
CPC ....... *H04N 21/4305* (2013.01); *H04N 21/4334* (2013.01); *H04N 21/47202* (2013.01); *H04N 21/482* (2013.01)

(58) Field of Classification Search
None
See application file for complete search history.

(56) References Cited

U.S. PATENT DOCUMENTS

| | | | |
|---|---|---|---|
| 2002/0184639 A1* | 12/2002 | Frost | H04N 7/17318 725/89 |
| 2005/0149987 A1* | 7/2005 | Boccon-Gibod | H04N 5/782 725/135 |
| 2005/0160461 A1* | 7/2005 | Baumgartner | G11B 27/32 725/52 |
| 2008/0209491 A1* | 8/2008 | Hasek | H04N 7/17318 725/114 |
| 2009/0216137 A1* | 8/2009 | Holland | G06F 17/141 600/508 |
| 2010/0094612 A1* | 4/2010 | Weerasinghe | 703/23 |
| 2011/0173653 A1* | 7/2011 | Arsenault | H04N 7/17336 725/31 |
| 2011/0297423 A1* | 12/2011 | Noh | H05K 3/4007 174/250 |
| 2011/0307739 A1* | 12/2011 | El Mahdy et al. | 714/28 |
| 2012/0081299 A1* | 4/2012 | Xiao et al. | 345/173 |
| 2012/0210356 A1* | 8/2012 | Kiok et al. | 725/39 |
| 2012/0297423 A1* | 11/2012 | Kanojia et al. | 725/48 |
| 2013/0007823 A1* | 1/2013 | Mangs | H04L 1/0061 725/109 |
| 2013/0007826 A1* | 1/2013 | Jenkin et al. | 725/110 |

* cited by examiner

*Primary Examiner* — Brian T Pendleton
*Assistant Examiner* — Jean D Saint Cyr

(57) ABSTRACT

A device may include one or more processors. The one or more processors may be configured to receive user input via a user interface and provide an appearance of selecting a channel, via a content presentation device connected to the device, without actually selecting the channel when the user input requests a particular program channel. The one or more processors may also be configured to display interactive program guide data at the content presentation device when the user input requests an interactive program guide and when the device is disconnected from a network from which the device received the interactive program guide data.

20 Claims, 6 Drawing Sheets

KIOSK SET-TOP-BOX

BACKGROUND

Many of today's entertainment or communication-related electronic devices rely on receiving, transmitting, and/or using streamed digital data or content. For example, a set-top box may receive broadcast television programs and/or video-on-demand (VOD) that is streamed from a content provider. A personal computer may receive a stream of a video clip over the Internet. A soft phone may receive streaming audio data over a real-time transport protocol (RTP) link/channel that is established over an Internet Protocol (IP) network.

DETAILED DESCRIPTION

The following detailed description refers to the accompanying drawings. The same reference numbers in different drawings may identify the same or similar elements. As used herein, the terms "playing content" may refer to decoding encoded content, and outputting the decoded content to a presentation device (e.g., a television). The encoded content may be obtained from a local media (e.g., a hard disk drive) or received from a remote device over a network.

As described herein, a device disconnected from a network may demonstrate different functionalities of a set-top-box and show different services that are offered by a network service provider. For example, a sales representative may use such a device to market the services in an environment that does not provide for network connectivity (e.g., in a kiosk). In another example, the device may be used to train technicians about the services (e.g., train the technicians to install a device at a customer home to provide the service). The device may imitate, for example, a set-top-box receiving a stream of content (e.g., video streams, audio streams, etc.) from another device over the network, playing video-on-demand (VOD), showing an interactive program guide (IPG), recording content, playing back content, receiving Internet content, and/or performing another operation.

Figure 1:
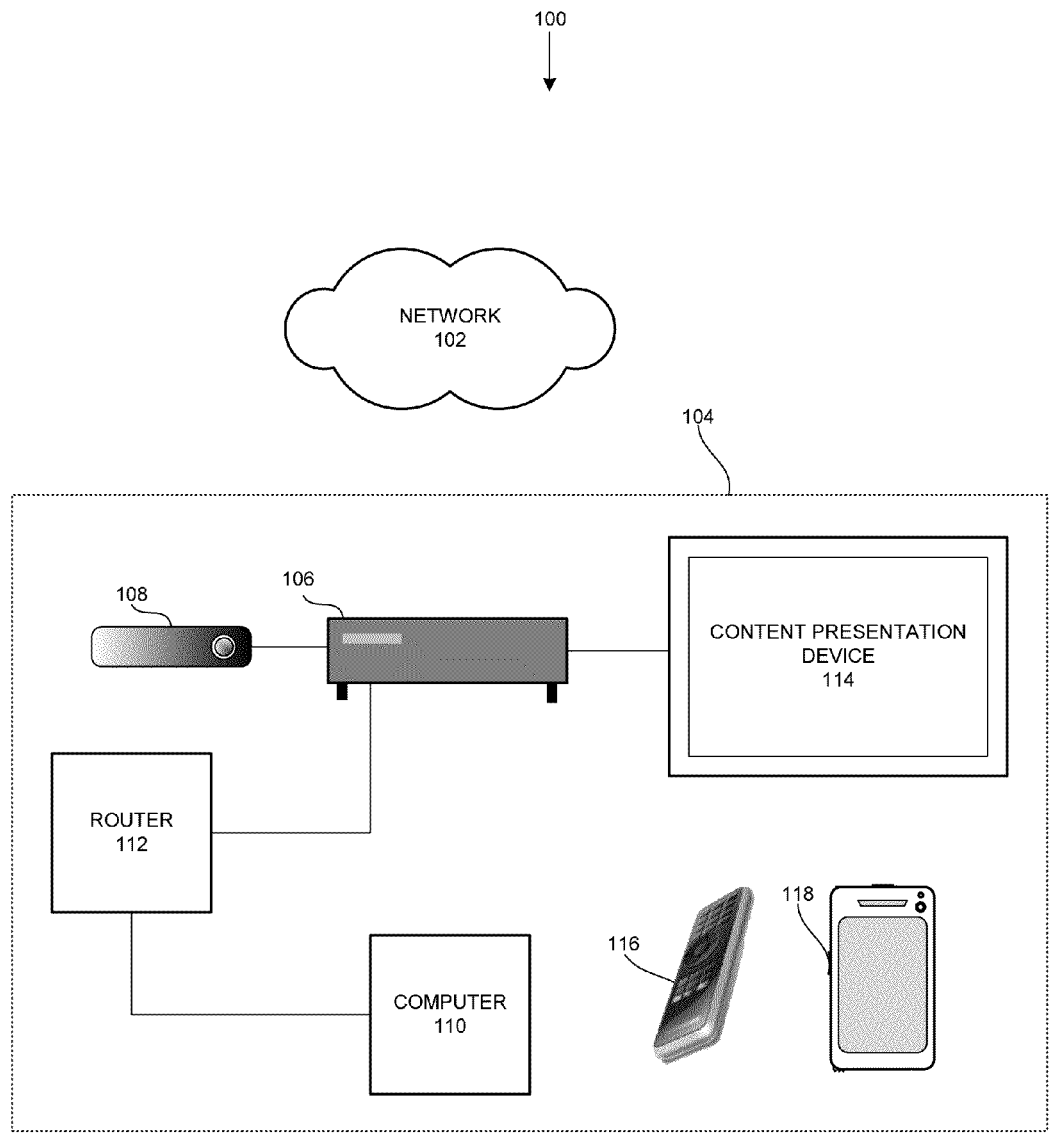
FIG. 1 illustrates an exemplary system in which concepts described herein may be implemented.

FIG. 1 illustrates an exemplary system 100 in which concepts described herein may be implemented. As shown, system 100 may include a network 102 and a kiosk 104. Depending on the implementation, system 100 may include additional, fewer, different, or a different arrangement of devices than those illustrated in FIG. 1. For example, in some implementations, system 100 may include, in place of kiosk 104, another type of apparatus or structure to provide for or support a particular arrangement of devices (e.g., devices 106-116). In another example, system 100 may not include network 102.

Network 102 may include one or more wired and/or wireless networks that are capable of exchanging information, such as voice, video, documents, multimedia, text, etc. For example, network 102 may include one or more public switched telephone networks (PSTNs) or another type of switched network. Network 102 may also include a number of transmission towers for receiving wireless signals and forwarding the signals toward the intended destination. Network 102 may further include one or more packet switched networks, such as an Internet protocol (IP) based network, a local area network (LAN), a wide area network (WAN), a personal area network (PAN), an intranet, the Internet, or another type of network that is capable of exchanging information.

Kiosk 104 includes an open or semi-open apparatus that may be used as a booth or a stand. As further shown, kiosk 104 may include a set-top-box (STB) mimicking device 106, a storage device 108, a computer 110, a router 112, a content presentation device 114, a remote control device 116, and/or a mobile communication device 118. Depending on the implementation, kiosk 104 may include additional, fewer, different, or a different arrangement of devices than those illustrated in FIG. 1. For example, kiosk 104 may include additional routers and/or storage devices, exclude computer 110, televisions, etc.

STB mimicking device 106 may emulate or mimic a set-top-box. For example, a set-top-box may receive commands from a remote control, receive content over a network, and play the content via a television. STB mimicking device 106 may receive commands from remote control, emulate receipt of content over a network by accessing content from storage device 108 (e.g., via a wired or wireless communication link), and/or play the content on content presentation device 114. In addition, STB mimicking device 106 may emulate displaying an interactive program guide (IPG), recording and/or playing recorded content, presenting live content (e.g., a sporting event, musical event (e.g., concert, etc.), video-on-demand content, etc. In some implementations, these functions that STB mimicking device 106 emulates may be for demonstration purposes. The functions may not provide for corresponding functions in a STB that is connected to a network.

In other implementations, STB mimicking device 106 may provide partially functional or fully functional capabilities of a STB. For example, STB mimicking device 106 may include widgets and/or applications, and allow users or potential customers to log into, for example, Facebook, Twitter, Spend Smart accounts, etc. In another example, STB mimicking device 106 may allow users to perform different search functions, including a search function for searching through multiple media content sources (e.g., searching VOD, DVR broadcast video, etc. all at once). In yet another example, STB mimicking device 106 may allow a user to play different games that would be available on a STB if the user were subscribed to particular services of a service provider in network 102.

Examples of STB mimicking device 106 may include a computer, a laptop computer, a tablet computer, or a modified/reprogrammed set-top box or a component (e.g., a cable card) that plugs into a host device (e.g., a digital video recorder, a personal computer, a television, stereo system, etc.) and allows the host device to display multimedia content (e.g., content on digital cable television channels). Although STB mimicking device 106 can be implemented as different types of devices, in the following, STB mimicking device 106 is described in terms of a modified set-top box.

Storage device 108 may include an external storage device, such as an external hard drive, a flash drive, a dongle, an optical drive, am optical storage device, a redundant array of independent disks (RAIDs), storage devices with ultra wide band (UWB) interface, etc. Storage device 108 may store data (e.g., IPG data, content (e.g., a movie trailer, advertisement, etc.) and provide data/content to STB mimicking device 106. During its configuration, storage device 108 may receive the content from STB mimicking device 106 or another device. In some implementations, STB mimicking device 106 may include one or more internal storage devices. In such implementations, system 100 may not include storage device 108.

Computer 110 may include a personal computer, a laptop computer, tablet computer, workstation, server computer, and/or another type of computational device. In some implementations, computer 110 may host an application (e.g., a media manager) for streaming video, photos, music, etc. to STB mimicking device 106. Additionally, computer 110 may also act as a server device for web content, aiding STB mimicking device 106 to emulate network-based functionalities. Router 112 may relay data/content to/from STB mimicking device 106 from/to computer 110.

Content presentation device 114 may include a device for playing media signals and/or signals from STB mimicking device 106. Examples of content presentation device 114 may include a television, one or more speakers and a display, a computer-like device having a client program, a portable digital assistant (PDA) or a cell phone capable of displaying a received video, etc. In the following paragraphs, content presentation device 106 is assumed to be a television.

Remote control 116 may include a device for generating and transmitting wireless commands to control electronic devices (e.g., a television, set-top box, stereo system, digital video disk (DVD) player, etc.), including STB mimicking device 106.

Mobile communication device 118 may include any of the following devices that have the ability to be or are adapted to operate as a remote control, such as a smart phone; a tablet computer; a gaming console; a personal digital assistant; or another type of device. In some implementations, mobile communication device 118 may be used in place of remote control device 116 to control STB mimicking device 106, content presentation device 114, and/or computer 110. In such cases, mobile communication device 118 may include an application that allows communication device 118 to operate as a remote control device.

In FIG. 1, when STB mimicking device 106 and storage device 108 are being configured, STB mimicking device 106 may be connected to network 102 to receive data (e.g., content, IPG data, etc.) and store the data in storage device 108 and/or STB mimicking device 106. Once STB mimicking device 106 downloads the data over the network, STB mimicking device 106 may be disconnected from network 102. Devices 106-114 may then be placed within kiosk 104 and configured to be interoperable. In other implementations, during its configuration, STB mimicking device 106 may receive the data via another device (e.g., flash drive). After the configuration, devices 106-114 in kiosk 104 may demonstrate services (e.g., video on demand, cable television programming, etc.) that are offered by a service/content provider.

Figure 2:
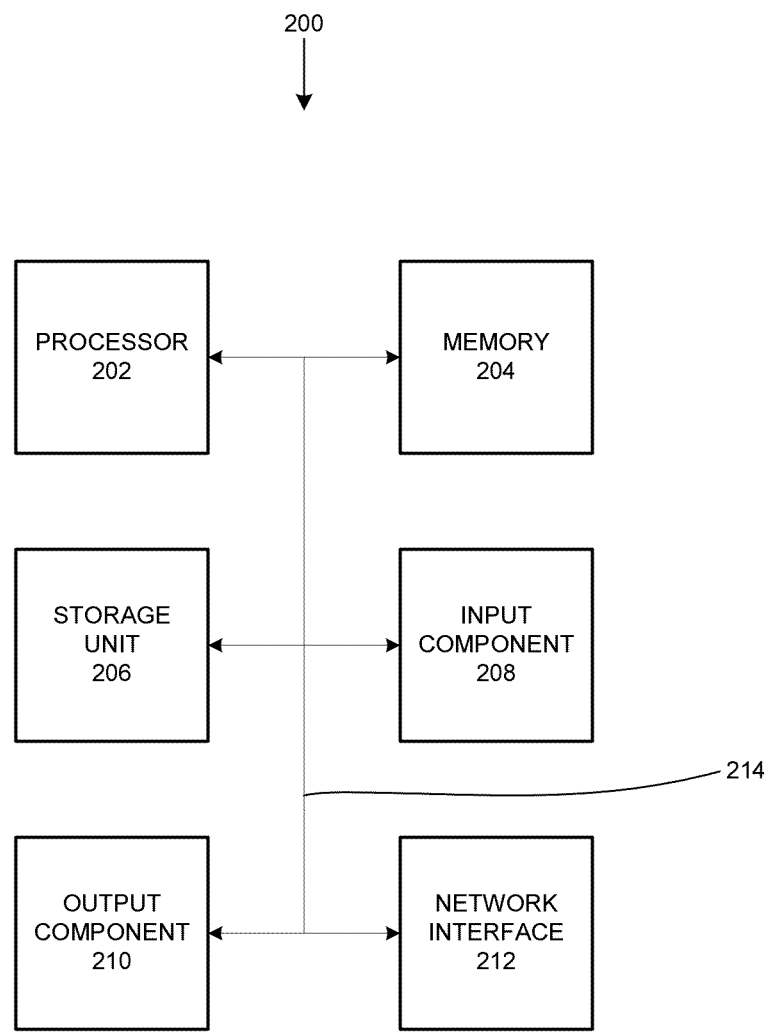
FIG. 2 is a block diagram of exemplary components of a device of FIG. 1.

FIG. 2 is a block diagram of exemplary components of device 200. Device 200 may represent any of devices 106 and 110-118. As shown, device 200 may include a processor 202, memory 204, storage unit 206, input component 208, output component 210, network interface 212, and communication path 214. In different implementations, device 200 may include additional, fewer, different, or different arrangement of components than the ones illustrated in FIG. 2. For example, device 200 may include line cards for connecting to external buses.

Processor 202 may include a processor, a microprocessor, an Application Specific Integrated Circuit (ASIC), a Field Programmable Gate Array (FPGA), and/or other processing logic (e.g., embedded devices) capable of controlling device 200.

Memory 204 may include static memory, such as read only memory (ROM), and/or dynamic memory, such as random access memory (RAM), or onboard cache, for storing data and machine-readable instructions (e.g., programs, scripts, etc.). Storage unit 206 may include a floppy disk, CD ROM, CD read/write (R/W) disc, and/or flash memory, as well as other types of storage devices (e.g., hard disk drive) for storing data and/or machine-readable instructions (e.g., a program, script, etc.).

Input component 208 and output component 210 may provide input and output from/to a user to/from device 200. Input/output components 208 and 210 may include a display screen, a keyboard, a mouse, a speaker, a microphone, a camera, a DVD reader, Universal Serial Bus (USB) lines, high definition media interface (HDMI), and/or other types of components for converting physical events or phenomena to and/or from signals that pertain to device 200.

Network interface 212 may include a transceiver (e.g., a transmitter and a receiver) for device 200 to communicate with other devices and/or systems. For example, via network interface 212, STB mimicking device 106, router 112, computer 110, and communication device 2118 may communicate with one another directly. In another example, when STB mimicking device 106 is connected to network 102, STB mimicking device may communicate with a content provider device over network 102.

Communication path 214 may provide an interface through which components of device 200 can communicate with one another.

Figure 3:
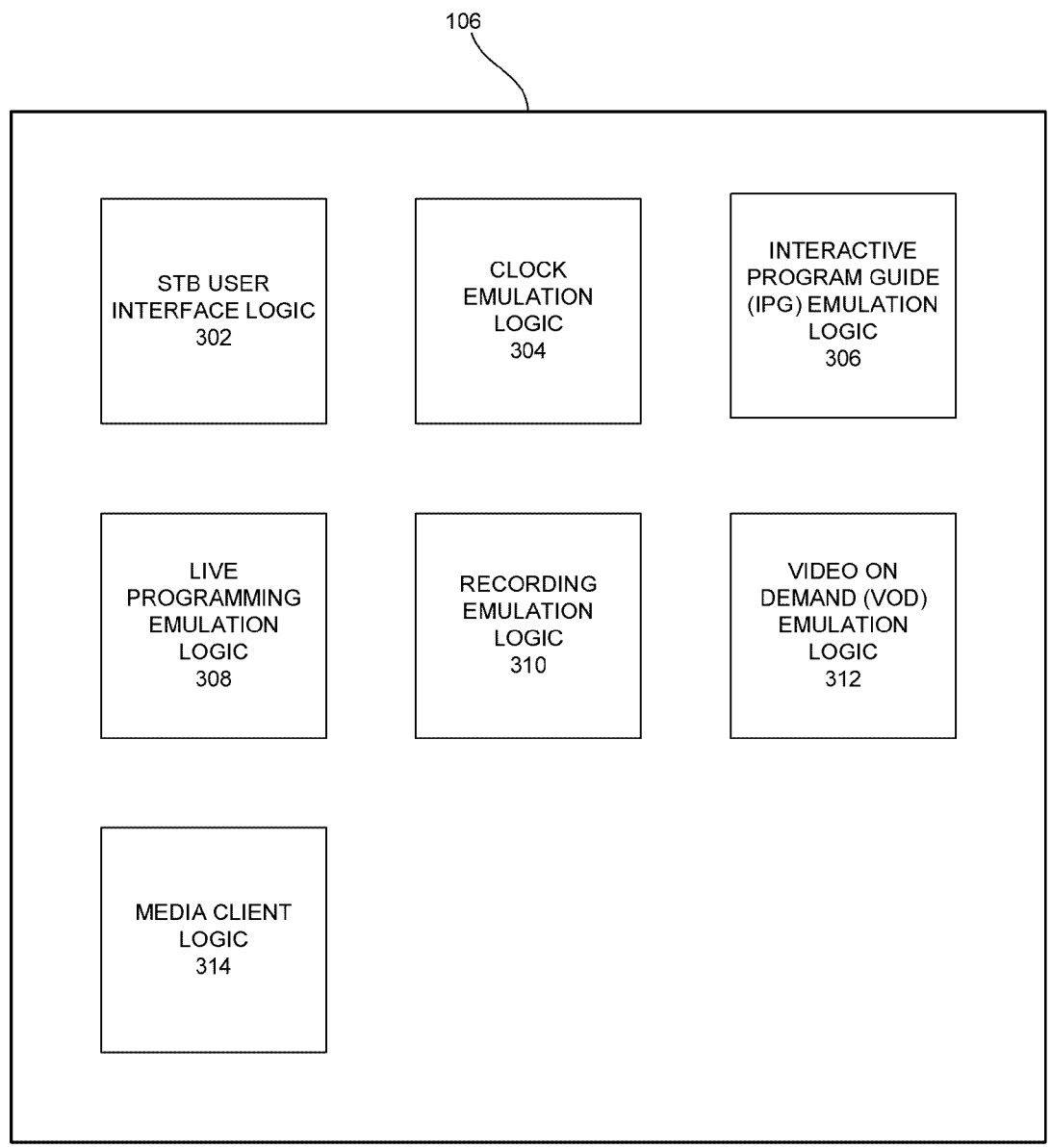
FIG. 3 is a block diagram of exemplary functional components of a set-top-box (STB) mimicking device of FIG. 1.

FIG. 3 is a block diagram of exemplary functional components of STB mimicking device 106. As shown, STB mimicking device 106 may include STB user interface logic 302, clock emulation logic 304, interactive program guide (IPG) emulation logic 306, live program emulation logic 308, recording emulation logic 310, video-on-demand (VOD) emulation logic 312, and media client logic 314. Depending on the implementation, STB mimicking device 106 may include additional, fewer, or different functional components than those illustrated in FIG. 3.

STB user interface logic 302 may provide a graphical user interface (GUI) via which STB mimicking device 106 may convey information to a user and receive input from the user. Via STB user interface logic 302 and content presentation device 114, STB mimicking device 106 may not only play content (e.g., video, music, etc.), but also allow the user to navigate different branches of menu trees and receive user input. For example, STB user interface logic 302 may provide GUI components that are associated with logic 304-314, receive input via the GUI components, and provide responses to the user input.

Clock emulation logic 304 may obtain the time at which recordings (stored in storage device 108 or STB mimicking device 106) were performed and may initiate a timer program or a timer thread, using the obtained time as the start time. The timer program/thread may provide the appropriate time to logic or an application that requests the current time.

In some implementations, when the time passes by more than a threshold, the timer program/thread may restart or loopback to the start time. This may keep the time as provided by the timer program/thread within a particular range. Additionally, in some implementations, clock emulation logic 304 may self-update the actual time based on a Network Time Protocol (NTP) server installed on computer 110.

IPG emulation logic 306 may provide STB user interface logic 302 with IPG data when IPG emulation logic 306 receives a request for the IPG data from STB user interface logic 302. IPG emulation logic 306 may have downloaded the IPG data from a network device during configuration of STB mimicking device 106 and when STB mimicking device 106 was connected to network 102. In some implementations, IPG emulation logic 306 may provide IPG data that provides information for multiple days' worth of programs (e.g., 14 days).

In some implementations, when STB mimicking device 106 is connected to network 102, IPG emulation logic 306 may be configured to periodically download new IPG data and delete old IPG data. IPG emulation logic 306 may initiate the IPG downloading activity by requesting the current time from clock emulation logic 304 and comparing the current time with the time stamp of the old IPG data. If a sufficient time has elapsed, IPG emulation logic 306 may remove the old IPG data and download new IPG data from a content provider's device in network 102.

IPG emulation logic 306, however, may be prevented from removing old IPG data and downloading new IPG data when STB mimicking device 106 is disconnected from network 102. More specifically, in such instances, when IPG emulation logic 306 requests the current time from clock emulation logic 304, clock emulation logic 304 may provide IPG emulation logic 306 with a time that is always within a predetermined range. Accordingly, the IPG data appears young (e.g., age of IPG<a threshold value), and IPG emulation logic 306 may neither erase the existing IPG data nor attempt to obtain more up-to-date IPG data.

After IPG emulation logic 306 provides IPG data to STB user interface logic 302, STB user interface logic 302 may display the IPG data via content presentation device 114. The user may access or interact with the IPG via STB user interface logic 302 and remote control device 116/mobile communication device 118.

Live programming emulation logic 308 may receive a user selection of a channel (or other content selection) via STB user interface logic 302 and remote control device 116. Based on the user selection, live program emulation logic 308 may identify one of the current recordings on STB mimicking device 106 or storage device 108, and provide the identity of the recording to STB user interface logic 302. STB user interface logic 302 may play the selected recording as if the recording were a live transmission.

To select a recording based on the user selected channel, live program emulation logic 303 may determine the following value.

$$\text{Recording No.}=M \bmod N. \quad (1)$$

In expression (1), M is the channel number and N is the total number of recordings on STB mimicking device 106 and/or storage device 108.

Figure 4:
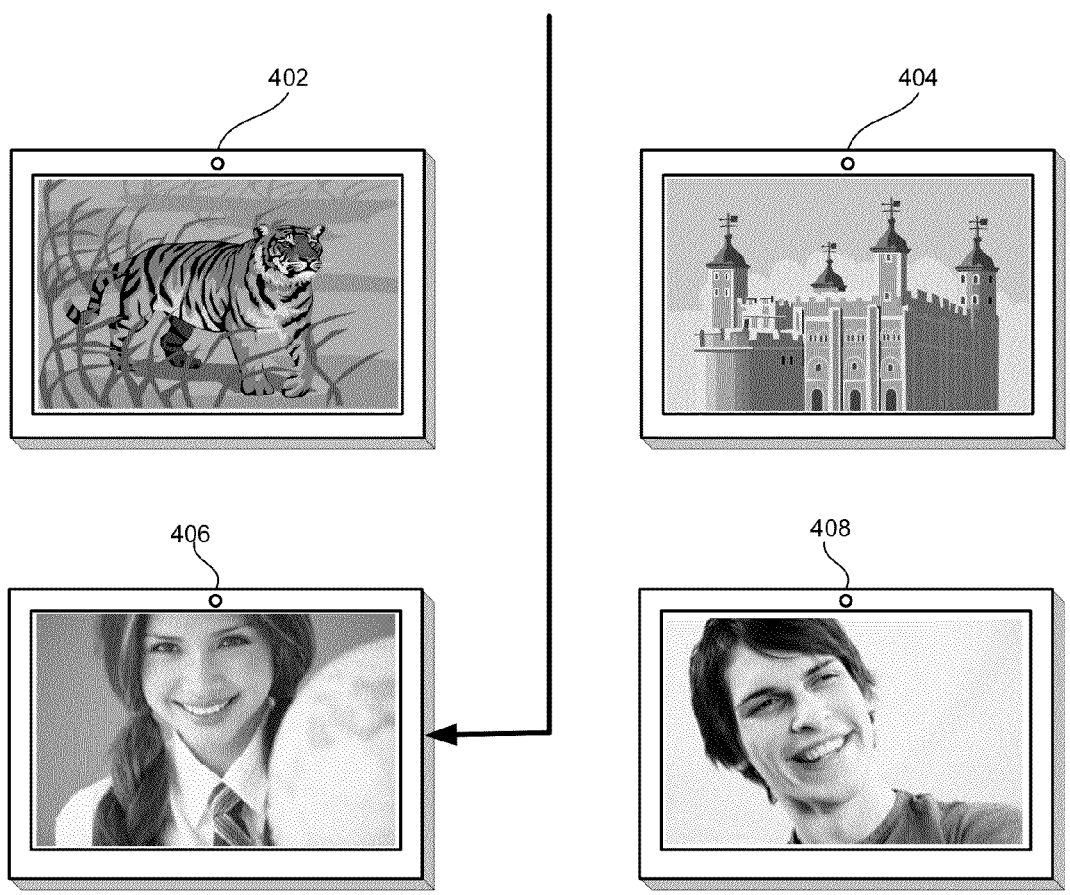
FIG. 4 illustrates an exemplary process that is associated with the exemplary live program emulation logic of FIG. 3.

FIG. 4 illustrates an exemplary process that is associated with live program emulation logic 308. Assume that the user selected channel number is 35 and the total number of stored recordings on and STB mimicking device 106 and storage device 108 is 4. As shown, in FIG. 4, the recorded programs are illustrated as recordings 402 through 408. When a user selects channel 35, live program emulation logic 308 calculates 35 mod 4=3, and consequently selects recording 406. Accordingly, STB user interface logic 302 plays recording 406 at content presentation device 114.

Returning to FIG. 3, recording emulation logic 310 may aid STB user interface logic 302 in faking a recording that a user requested at STB mimicking device 106. When a user schedules a recording via STB user interface logic 302 and a remote control device 116, recording emulation logic 310 may mark/flag metadata that is associated with the program (which was played back).

Figure 5:
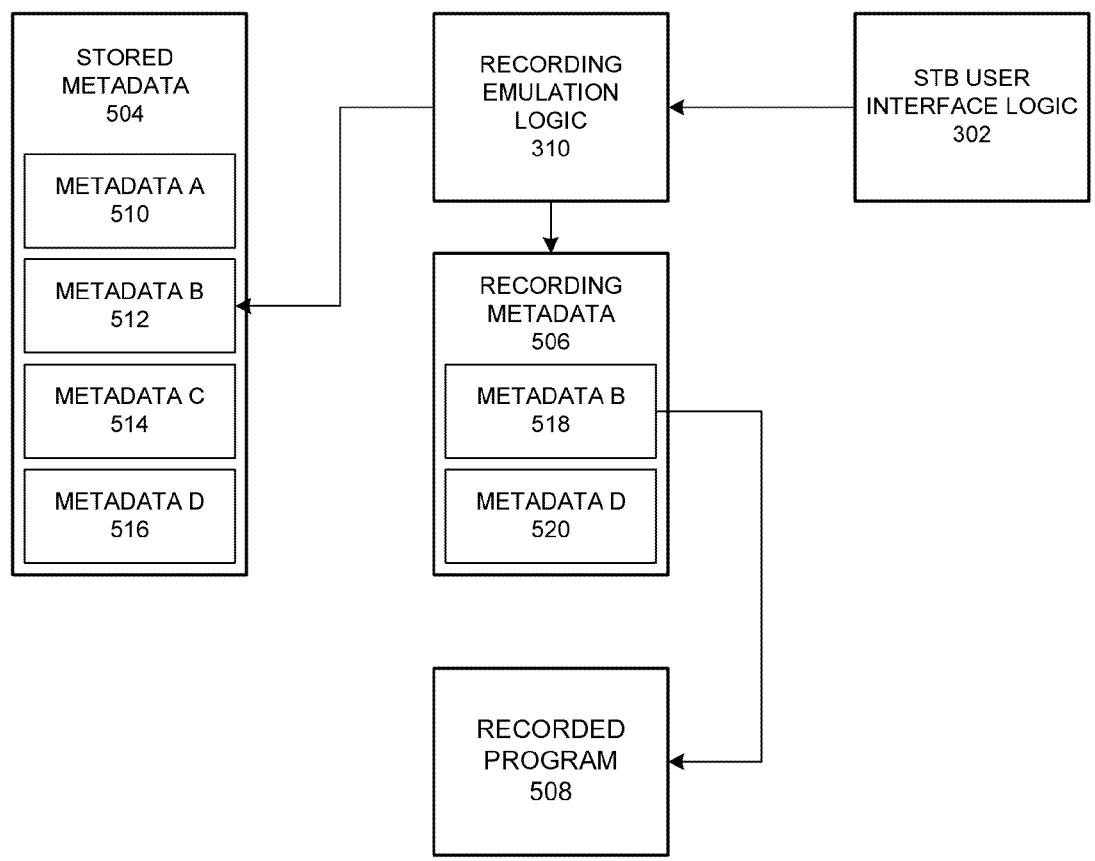
FIG. 5 illustrates an exemplary process that is associated with the exemplary recording emulation logic of FIG. 3.

FIG. 5 illustrates an exemplary process that is associated with recording emulation logic 310. As shown in FIG. 5, STB mimicking device 106 may include stored metadata 504, recordings metadata 506, and a recorded program 508 that is associated with a set of metadata. Although not shown, STB mimicking device 106 may include additional recorded programs, each of which is also associated with different sets of metadata.

Stored metadata 504 may include one or more sets of metadata. Each set of metadata may be associated with a program stored in STB mimicking device 106 or storage device 108. In FIG. 5, stored metadata 504 includes metadata A 510, metadata B 512, metadata C 514, and metadata D 516. Recordings metadata 506 may include one or more sets of metadata that represent programs which are emulated or faked as having been recorded upon receipt of the user request.

In FIG. 5, when STB user interface logic 302 receives a user request to record a particular program (which is already recorded), STB user interface logic 302 may request recording emulation logic 310 to record the program. However, recording emulation logic 310, instead of actually recording the program, merely copies the metadata associated with the program into recordings metadata 508. As shown in FIG. 5, recordings metadata 508 includes metadata B 518 and metadata D 520, thus faking/emulating that programs associated with metadata B 518 and metadata D 520 are to be recorded and/or have been recorded.

When the user requests, via STB user interface logic 302, a list of recorded programs, STB user interface logic 302 retrieves recordings metadata 508 and lists identifiers that are associated with different sets of metadata within recordings metadata 508. Based on the list, the user may then select any of the metadata in recordings metadata 508. For example, the user may select metadata B 518. In response, STB user interface logic 302 may play recorded program 508 (which is associated with metadata B 518) at content presentation device 114.

In some implementations, recording emulation logic 310 may fake or emulate a scheduling conflict by counting the number of recordings that the user attempts to initiate and indicating to STB user interface logic 302 that there is a scheduling conflict if the number of recordings exceed a predetermined threshold.

Returning to FIG. 3, video-on-demand (VOD) emulation logic 312 may emulate receipt and delivery of a VOD. For example, a user may navigate through VOD library via STB user interface logic 302. Once the user sees a desirable video, the user may request a VOD via STB user interface logic 302. In turn, STB user interface logic 304 may request VOD emulation logic 312 obtain a VOD title that is from a list of recorded programs. Upon receipt of the VOD title from VOD emulation logic 312, STB user interface logic 302 may play the VOD title, indicating that the content is being streamed to STB mimicking device 106, from a network device.

In some implementations, not all of the videos associated with VOD titles may have been recorded and stored on STB mimicking device 106 or storage device 108. In such implementations, STB mimicking device 106 may include trailers that are associated with the VOD titles in place of the VOD titles. Each trailer may be associated with an identifier for a VOD title. Upon receipt of a request to obtain the VOD, VOD emulation logic 312 may match the trailer with the identifier for the VOD title and play back the trailer.

Media client logic 314 may receive content from a media manager on a device in a network (e.g., a network formed by computer 110, router 112, and STB mimicking device 106). For example, a user may serve content from computer 110 to media client logic 314. The content may include movies/video, music, other types of audio, photos, etc. The user may access the received content at STB mimicking device 106 or storage device 108 via STB user interface logic 302 and media client logic 314. In some implementations, media client logic 314 may also interact with a user at a media management program on another device over a network (e.g., computer 110) and permit the user to manage (e.g., duplicate, sort, delete, or organize) recordings, contents, and/or other types of data on STB mimicking device 106 and/or storage device 108, via media client logic 314.

Although not illustrated in FIG. 3, each STB mimicking device 106 may include a Domain Name System (DNS) cache. When STB mimicking device 106 sends a message to another local device (e.g., computer 110), the message is routed to the local device via, for example, router 112. However, if STB mimicking device 106 attempts to sends a request to a device outside of the local network, components on STB mimicking device 106 may fake or emulate transmission of the request and may processes the message at STB mimicking device 106.

Returning to FIG. 1, although FIG. 1 shows a single kiosk 104 and a single STB mimicking device 106, system 100 may include multiple kiosks (e.g., 100, 1000, etc.) and multiple STB mimicking devices 106. For such implementations, STB mimicking devices 106 may need to be produced or manufactured in large numbers.

Producing STB mimicking devices 106 in large numbers may entail copying hard drives in one STB mimicking device 106 to hard drives on other STB mimicking devices 106. However, in some implementations, an encryption/decryption program that is implemented on a STB mimicking device 106 for accessing hard drives may prevent any hard drive that was not originally manufactured as part of the original STB mimicking device 106 from being used together with a different STB mimicking device 106. More specifically, in such devices, once content is recorded to a hard drive, another STB mimicking device (within which the hard drive is installed) may not access the recorded content.

To allow a duplicated hard drive to be operational with STB mimicking devices 106, each STB mimicking device 106 may include replacement system software/firmware that outputs the identical device/system parameters for different STB mimicking devices 106 and/or hard drives. When the encryption/decryption program requests the system parameters from the system software/firmware on a host STB mimicking device 106, the system software/firmware may provide the encryption/decryption program with the system parameters of the original STB mimicking device 106/storage device 108, whose contents were copied to the host STB mimicking device 106.

In some implementations, applications that are hosted on STB mimicking device 106 may access and use a unit address that is associated with the STB mimicking device 106. Each STB mimicking device 106 may include the same unit address of the original STB mimicking device 106 from which the STB mimicking 106 is cloned (e.g., by copying contents of one STB mimicking device 106 to another STB mimicking device 106).

Once STB mimicking devices have been created/produced (e.g., by copying the original STB mimicking device), STB mimicking devices 106 may be maintained, updated, repaired, and/or modified with new hardware, firmware, and/or software. In some implementations, to facilitate such maintenance, each STB mimicking device 106 may be outfitted with a network interface (e.g., network interface 212) via which STB mimicking device 106 may connect to, for example, a wireless link/network that includes an update server. The wireless link/network does not need to support high bandwidths necessary to support real-time viewing of content delivered over the network. That is, the wireless link/network can be low-bandwidth.

From the update server, via the wireless network, each STB mimicking device 106 may receive updates to STB user interface logic 302, clock emulation logic 304, IPG emulation logic 306, live programming emulation logic 308, recording emulation logic 310, VOD emulation logic 312, media client logic 314, etc. In some implementations, rather than using the wireless network, system 100 may include an updating station to which each of STB mimicking device 302 may be delivered and connected/attached for updates.

Each update may include, for example, new VOD titles, trailers, new clock emulation logic 304 with a new time range, new STB user interface logic 302 and IPG emulation logic 306 with new IPG capabilities, live programming logic 308 with a different method for selecting a channel (e.g., selecting a channel based on a random number generator), recording emulation logic 310 with new recordings and new metadata, etc. Each update may be scheduled (e.g., periodic) or may be made based on its availability.

Figure 6:
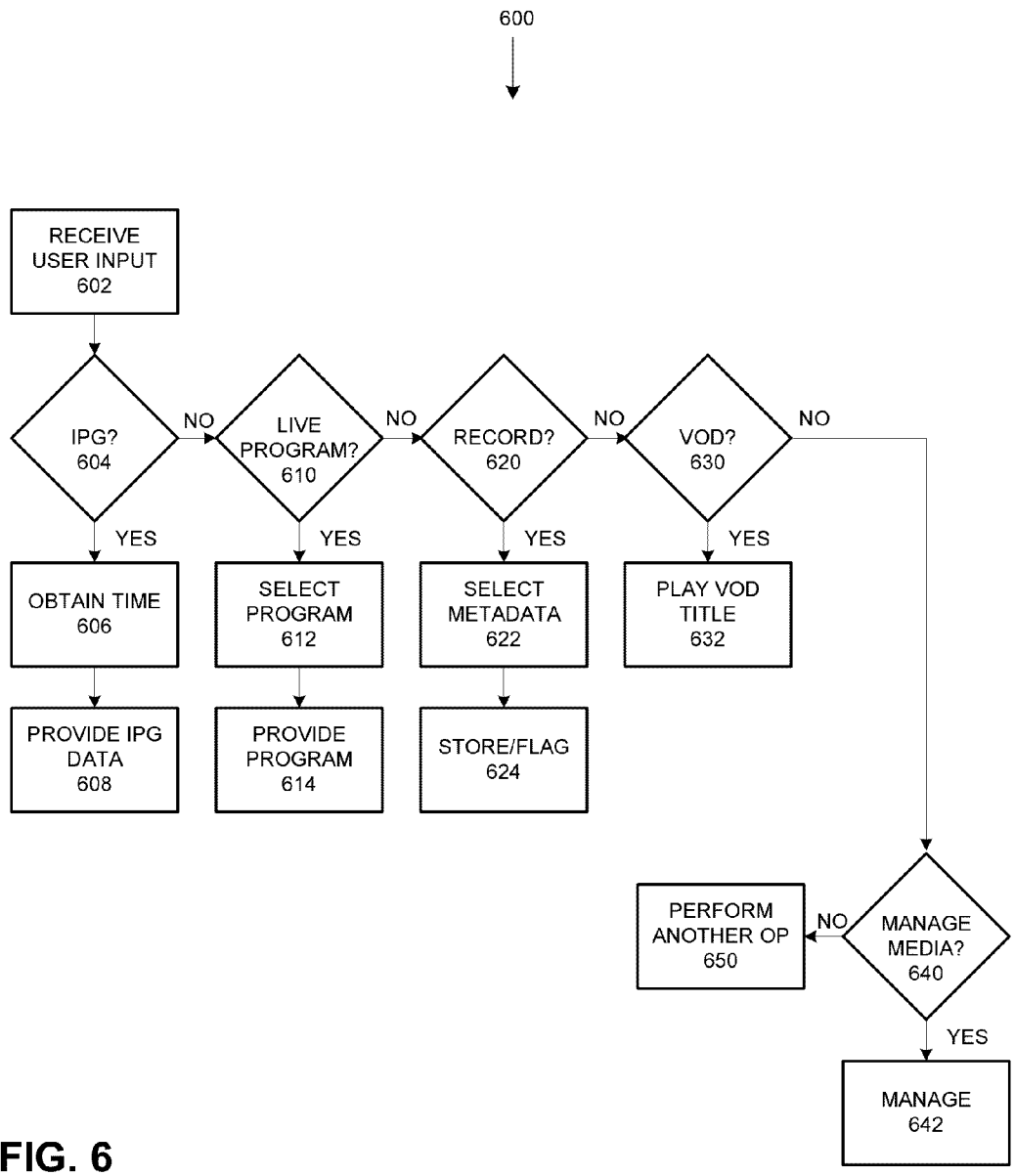
FIG. 6 is a flow diagram of an exemplary process that is associated with the STB mimicking device of FIG. 1.

FIG. 6 is a flow diagram of an exemplary process 600 associated with STB mimicking device 106. Assume that devices 106-116 are turned on and that none of devices 106-116 is connected to network 102. Process 600 may include STB mimicking device 106 receiving input from a user (e.g., a customer at kiosk 104) via, for example, remote control device 116 or communication device 118 (block 602).

STB mimicking device may determine whether the input requests an IPG (block 604). If the input is a request for an IPG (block 604: yes), STB mimicking device 106 may obtain a emulated time provided by clock emulation logic 304 (block 606). STB mimicking device 106 may fetch the IPG data and provide the IPG data to the user, for example, via content presentation device 114 (block 608). Thereafter, the user may interact with the IPG.

If the input is not a request for the IPG (block 604: no), STB mimicking device 106 may determine whether the input is a command/request for a live program (block 610). If so (block 610: yes), STB mimicking device 106 may select a program by determining N modulo M (block 612), where N is the selected channel number selected by the user and M is the number of recorded "live" programs. STB mimicking device 106 may provide the program designated by N modulo M via content presentation device 114 (block 614).

If the input is not a request/command for a live program (block 610: no), STB mimicking device 106 may determine whether the input is a command/request to schedule a recording (block 620). If so (block 620: yes), STB mimicking device 106 may select a metadata of already recorded program (block 622), and flag/store the selected metadata as if the program associated with the selected metadata has been recorded (block 624).

If the input is not a request/command to schedule a recording (block 620: no), STB mimicking device 106 may determine whether the input is a command/request for a VOD (block 630). If the input is a command/request for the VOD (block 630: yes), STB mimicking device 106 may play a VOD title, faking that the VOD is being streamed from a network device (block 632). If the VOD title is not available, STB mimicking device 106 may play a corresponding trailer in place of the VOD title.

If the input is not a command/request for a VOD (block 630: no), STB mimicking device 106 may determine whether the input is a command/request for managing media (block 640). If so (block 640: yes), STB mimicking device 106 may interact with the user to manage (e.g., delete, remove, copy, etc.) media (block 642). If the input is not a commend or a request to manage media (block 640: no), STB mimicking device 106 may perform actions that are associated with another type of command/request (block 650).

As described above, STB mimicking device 106 may demonstrate different functionalities of a set-top-box while not being connected to network 102. Furthermore, STB mimicking device 106 may demonstrate different services that are offered by a network service provider while STB mimicking device 106 is not connected to network 102.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

In addition, while series of blocks have been described with regard to an exemplary process illustrated in FIG. 6, the order of the blocks may be modified in other implementations. For example, in process 600, blocks 604-610, 620-624, 630-632, 640-642, and 650 are associated with providing different types of responses to different user input. In different implementations, the order in which the user input is tested (e.g., determining whether the input is a request for IPG data at block 604) may be different. More specifically, for example, in one implementation, STB mimicking device 106 may determine whether the input is a request for a VOD before STB mimicking device 106 determine whether the input is a request for IPG data. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A device comprising:
   one or more processors configured to:
   receive, via a user interface, user input requesting a television channel of a plurality of television channels;
   access, responsive to the user input, a database storing media programs for presenting over the plurality of television channels, via a content presentation device that is connected to the device and is not connected to any network that provides a television content stream for the requested television channel, wherein a number of the plurality of television channels exceeds a number of the stored media programs; determine N modulo M, wherein N is a channel number provided by the user input and M is the number of the stored media programs; designate, from the stored media programs and based on the determination of N modulo M, a particular stored media program for presenting over the requested television channel; and display, via the content presentation device, interactive program guide data associated with the plurality of television channels when the user input requests an interactive program guide and when the device is disconnected from a network from which the device received the interactive program guide data.

2. The device of claim 1, wherein the one or more processors are further configured to:
   indicate, via the content presentation device, that the device is recording content from the network, without actually recording the content, when the user input requests the device to record the content and a number of previous user input requests to record other content does not exceed a threshold number,
   wherein the content is stored at the device prior to the indication.

3. The device of claim 2, wherein the one or more processors are further configured to: after indicating that the content is being recorded, flag metadata that is associated with the content to indicate that the content has been recorded.

4. The device of claim 1, wherein the one or more processors are further configured to:
   indicate, via the content presentation device, that the device is downloading a video-on-demand without actually downloading the video-on-demand from the network when the user input requests the video-on-demand.

5. The device of claim 4, wherein when the one or more processors indicate that the device is downloading the video-on-demand, the device plays a video-on-demand title at the content presentation device,
   wherein the video-on-demand title is stored at the device.

6. The device of claim 5, wherein the one or more processors are further configured to:
   play a trailer for the video-on-demand when the video-on-demand title is not available.

7. The device of claim 1, wherein the device includes:
   a modified set-top-box;
   a computer;
   a laptop computer; or
   a tablet computer.

8. The device of claim 1, wherein the one or more processors are further configured to:
   emulate a system clock that starts counting from a particular time and loops back to the particular time when more than a specified amount of time elapses,
   wherein the one or more processors determine whether to remove the interactive program guide data based on a time from the system clock.

9. The device of claim 8, wherein the system clock is configured to:
operate in accordance with a network time protocol.

10. The device of claim 1, wherein the one or more processors are further configured to:
manage media stored on the device when the user input is a command to manage the media.

11. The device of claim 1, further comprising at least one of:
a unit address that is identical to a unit address of another device from which the device was cloned; or
a program or firmware for providing parameters of the device,
wherein the parameters are identical to parameters of another device from which the device was cloned.

12. The device of claim 1, further comprising:
a domain system name (DNS) cache for forwarding messages from the device to another device connected to the device through a router.

13. A system comprising: a device, comprising one or more processors configured to: receive, via a user interface, user input requesting a television channel of a plurality of television channels,
access, responsive to the user input, a computer storing media content for presenting over the plurality of television channels, via a content presentation device that is connected to the device and is not connected to any network that provides a television content stream for the requested television channel, wherein a number of the plurality of television channels exceeds a number of the stored media content,
determine N modulo M, wherein N is a channel number provided by the user input and M is the number of the stored media content,
designate, from the accessed media content and based on the determination of N modulo M, a particular stored media content for presenting over the requested television channel, and display, via the content presentation device, interactive program guide data associated with the plurality of television channels when the user input requests an interactive program guide and when the device is disconnected from a network from which the device received the interactive program guide data; and
the computer, functionally coupled to the device, to send the particular stored media content to the device, wherein the computer includes a program for serving the particular stored media content to the device.

14. The system of claim 13, further comprising:
a router for relaying the particular stored media content from the computer to the device.

15. The system of claim 13, further comprising:
a storage device connected to the device, the storage device including the interactive program guide data.

16. The system of claim 13, further comprising:
a router connected to the computer and the device,
wherein the device further comprises a domain system name (DNS) cache for forwarding a message to the computer via the router.

17. The system of claim 13, further comprising at least one of:
a remote control device for transmitting the user input to the device; or
a mobile communication device for controlling the device and for sending the user input to the device.

18. A method performed by a device, comprising:
receiving, via a user interface of the device, user input requesting a television channel of a plurality of television channels; accessing, in response to the user input, a database storing media programs for presenting over the plurality of television channels, via a content presentation device that is connected to the device and is not connected to any network that provides a television content stream for the requested television channel, wherein a number of the plurality of television channels exceeds a number of the stored media programs; determining N modulo M, wherein N is a channel number provided by the user input and M is the number of the stored media programs; designating, from the stored media programs and based on the determination of N modulo M, a particular stored media program for presenting over the requested television channel; and displaying, via the content presentation device, interactive program guide data associated with the plurality of television channels when the user input requests an interactive program guide and when the device is disconnected from a network from which the device received the interactive program guide data.

19. The method of claim 18, wherein the device comprises a modified set-top box.

20. The method of claim 18, wherein the device comprises a computer, a laptop computer, or a tablet computer.

* * * * *

UNITED STATES PATENT AND TRADEMARK OFFICE
CERTIFICATE OF CORRECTION

| | | |
|---|---|---|
| PATENT NO. | : 9,294,803 B2 | Page 1 of 1 |
| APPLICATION NO. | : 13/208949 | |
| DATED | : March 22, 2016 | |
| INVENTOR(S) | : Brian Edward Bond et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 924 days.

Signed and Sealed this
Twenty-sixth Day of July, 2016

Michelle K. Lee
*Director of the United States Patent and Trademark Office*